(12) United States Patent
Tsukamoto

(10) Patent No.: US 6,167,860 B1
(45) Date of Patent: Jan. 2, 2001

(54) METHOD OF CONTROLLING IDLE OF INTERNAL COMBUSTION ENGINE

(75) Inventor: Takanori Tsukamoto, Okazaki (JP)

(73) Assignees: Toyota Jidosha Kabushiki Kaisha; Toyoda Gosei Co., Ltd., both of Aichi-ken (JP)

( * ) Notice: Under 35 U.S.C. 154(b), the term of this patent shall be extended for 0 days.

(21) Appl. No.: 09/129,536

(22) Filed: Aug. 5, 1998

(30) Foreign Application Priority Data

Sep. 3, 1997 (JP) .................................................... 9-238742

(51) Int. Cl.[7] ............................ F02B 75/06; F02D 41/08; F02M 3/06
(52) U.S. Cl. .................................... 123/192.1; 123/339.23
(58) Field of Search .............................. 123/192.1, 192.2, 123/339.1, 339.23, 339.14, 339.19; 267/140.14, 140.13, 140.15; 100/312

(56) References Cited

U.S. PATENT DOCUMENTS

| | | | |
|---|---|---|---|
| 5,393,041 | * 2/1995 | Takano et al. | 267/140.14 |
| 5,437,437 | * 8/1995 | Takano et al. | 267/140.14 |
| 5,507,262 | * 4/1996 | Isobe et al. | 123/339.23 |
| 5,632,249 | * 5/1997 | Sadakane et al. | 123/442 |
| 5,769,402 | * 6/1998 | Ide et al. | 267/140.14 |
| 5,823,163 | * 10/1998 | Hoshi | 123/336 |
| 5,865,428 | * 2/1999 | Kojima | 267/140.14 |
| 5,918,462 | * 7/1999 | Mitani | 60/397 |

FOREIGN PATENT DOCUMENTS

| | | |
|---|---|---|
| 59-65635 | 4/1984 | (JP) . |
| 3-66949 | 3/1991 | (JP) . |
| 5-319109 | 12/1993 | (JP) . |
| 6-137361 | 5/1994 | (JP) . |
| 6-288421 | 10/1994 | (JP) . |

* cited by examiner

*Primary Examiner*—Tony M. Argenbright
*Assistant Examiner*—Hai Huynh
(74) *Attorney, Agent, or Firm*—Oliff & Berridge, PLC

(57) ABSTRACT

A method of controlling idle of an internal combustion engine including a variable vibro-isolating supporting device for actualizing vibro-isolating characteristics corresponding to a variety of vibrations, comprises a step of increasing a frequency of idle vibrations by increasing the number of idling rotations of the internal combustion engine by a predetermined number of rotations under a suing environment where a desired vibro-isolating effect is not obtained by the variable vibro-isolating supporting device, thereby preventing the idle vibrations from being transmitted to a car body side of an automobile etc.

5 Claims, 4 Drawing Sheets

METHOD OF CONTROLLING IDLE OF INTERNAL COMBUSTION ENGINE

BACKGROUND OF THE INVENTION

The present invention relates to a method of controlling idle of an internal combustion engine supported by a variable vibro-isolating supporting device a vibro-isolating characteristic of which is variably controlled corresponding to a vibration characteristic inputted.

In an automobile etc, a device for supporting an internal combustion engine on a car body side involves the use of a vibro-isolating supporting device incorporating a function of preventing a variety of vibrations such as engine shakes and idle vibrations of the internal combustion engine from being transmitted to the car body side.

What is known as the vibro-isolating supporting device is a variable vibro-isolating supporting device the vibro-isolating characteristic of which is variable corresponding to characteristics of the variety of vibrations as in the case of an active mount disclosed in Japanese Patent Application Laid-Open Publication No.3-66949 and a liquid-sealed vibro-isolating device disclosed in Japanese Patent Application Laid-Open Publication No.6-137361.

The active mount disclosed in Japanese Patent Application Laid-Open Publication No.3-66949 is intended to damp the vibrations transmitted from the internal combustion engine to the car body side by expanding and contracting a piezoelectric element laminated member so as to follow up the vibrations when the vibrations are inputted from the internal combustion engine.

Further, the liquid-sealed vibro-isolating device disclosed in Japanese Patent Application Laid-Open Publication No.6-137361 includes an elastic member composed of rubber in the device, a main liquid chamber in which a liquid sealed, an auxiliary liquid chamber communicating via a throttle passageway (an orifice) with this main liquid chamber, and a movable diaphragm for partitioning an interior of the auxiliary liquid chamber into a liquid sealing chamber and an air chamber. The liquid-sealed vibro-isolating device is constructed to change a dynamic spring characteristic of the whole device by selectively introducing an intake air negative pressure and an atmospheric pressure, and thus actualize the vibro-isolating characteristics adapted to a variety of vibration characteristics.

The variable vibro-isolating supporting devices described above are capable of obtaining damping effects and vibro-isolating effects corresponding to the variety of vibrations and therefore enhancing a drivability.

Incidentally, in the variable vibro-isolating supporting device described above, conditions in a using environment are not taken into consideration. For example, if the device set to obtain desired vibro-isolating and damping characteristics at a normal temperature is used at an extremely low temperature, the dynamic spring characteristic of the whole device can not be controlled to a desired characteristic due to hardening of the elastic member and a change in expanding/contracting characteristics of the piezoelectric element, resulting in declines of the vibro-isolating effect and of the damping effect.

Further, if the liquid-sealed vibro-isolating device disclosed in Japanese Patent Application Laid-Open Publication No.6-137361 is used in a highland etc, the dynamic spring characteristic of the whole device might change due to a change in the atmospheric pressure, and the vibro-isolating effect declines.

Moreover, the active mount disclosed in Japanese Patent Application Laid-Open Publication No.3-66949 might be short of the driving voltage of the piezoelectric element when the battery would be deteriorated with a passage of time, and exhibits declines of the vibro-isolating and damping effects.

To obviate such problems, there has hitherto been provided an abnormality control device in an active type vibro-isolating device disclosed in Japanese Patent Application Laid-Open Publication No.6-288421. This abnormality control device detects a temperature of the piezoelectric element and, if the detected element temperature becomes a predetermined value or more, stops the drive of the active mount. Namely, the abnormality control device judges that the expanding/contracting characteristics of the piezoelectric element laminated member largely fluctuates when the element temperature is high with the result that the desired vibro-isolating and damping effects are not obtained and, besides, the vibration might be further deteriorated, and therefore halts the drive of the active mount. As explained above, the abnormality control device is constructed to prevent an occurrence of vibrations which exert an adverse influence upon the vehicle performance under such an environment that the desired vibro-isolating characteristic is not obtained.

The vibrations of the internal combustion engine are, however, transmitted directly to the car body side simply by stopping the drive of the active mount under the environment where the desired vibro-isolating characteristic is not obtained. In particular, the number of idling rotations of the internal combustion engine supported by the active mount is so controlled as to be set lower than that of the internal combustion engine supported by an ordinary engine mount, allowing for the vibro-isolating effect of the active mount, and hence, if when the drive of the active mount is halted, the idle vibrations larger than normal are transmitted to the car body side. This might result in a problem of causing an ill-feeling in riding.

SUMMARY OF THE INVENTION

To overcome the above problem of causing the ill-feeling in riding, in an internal combustion engine supported by a variable vibro-isolating supporting device for actualizing vibro-isolating characteristics corresponding to a variety of vibrations, it is an object of the present invention to provide a technology capable of restraining deterioration of idle vibrations even if a desired vibro-isolating effect is not obtained due to variations in using environment conditions.

The present invention adopts the following constructions in order to obviate the problems described above.

According to one aspect of the present invention, a method of controlling idle of an internal combustion engine supported by a variable vibro-isolating supporting device a vibro-isolating characteristic of which is variably controlled to reduce idle vibrations when in an idling operation, comprises a step of increasing the number of idling rotations of the internal combustion engine by a predetermined number of rotations under a using environment in which a desired vibro-isolating effect is not obtained by the variable vibro-isolating supporting device.

Normally, a frequency of the idle vibrations of the internal combustion engine becomes higher as the number of rotations of the engine becomes greater, and the idle vibrations are hard to be transmitted to the car body side. Therefore, under the using environment where the desired vibro-isolating characteristic can not be obtained by the variable vibro-isolating supporting device, the idle vibrations of the internal combustion engine becomes hard to be transmitted to the car body side by increasing the number of idling rotations by the predetermined number of rotations, thereby preventing the deterioration of the idle vibrations.

The following is what ca be considered as the using environment where the variable vibro-isolating supporting device is incapable of actualizing the desired vibro-isolating characteristic.

(1) If the variable vibro-isolating supporting device is a device including at least an elastic member, under a using environment in which a temperature of said elastic member is over an upper limit value or under a lower limit value, the characteristic of the elastic member changes, and hence the variable vibro-isolating supporting device is incapable of actualizing a desired vibro-isolating characteristic.

(2) If the variable vibro-isolating supporting device is a liquid-sealed type engine mount constructed by sealing a liquid in the device, under a using environment in which a temperature of the liquid is over an upper limit value or under a lower limit value, the characteristic of the liquid changes, and therefore the variable vibro-isolating supporting device is incapable of actualizing the desired vibro-isolating characteristic.

(3) If the variable vibro-isolating supporting device is a device for changing the vibro-isolating characteristic by introducing the atmospheric pressure into the device, under a using environment in which a the atmospheric pressure is over an upper limit value or under a lower limit value, the atmospheric pressure decreases, and therefore the variable vibro-isolating supporting device is incapable of actualizing the desired vibro-isolating characteristic.

(4) If the variable vibro-isolating supporting device is a device driven by a battery voltage, under a using environment in which the battery voltage is over an upper limit value or under a lower limit value, the variable vibro-isolating supporting device can not be precisely driven, and hence the variable vibro-isolating supporting device is incapable of actualizing the desired vibro-isolating characteristic.

In the above cases (1)–(4), when the number of idling rotations of the internal combustion engine is increased by the predetermined number of rotations, the frequency of idle vibrations rises, and consequently the idle vibrations are hard to be transmitted to the car body side. As a result, the ill-feeling in riding is restrained even under the using environment where the vibro-isolating characteristic of the variable vibro-isolating supporting device can not ne controlled to the desired characteristic.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

An embodiment of a variable vibro-isolating supporting device according to the present invention will hereinafter be described with reference to the accompanying drawings.

Figure 1:
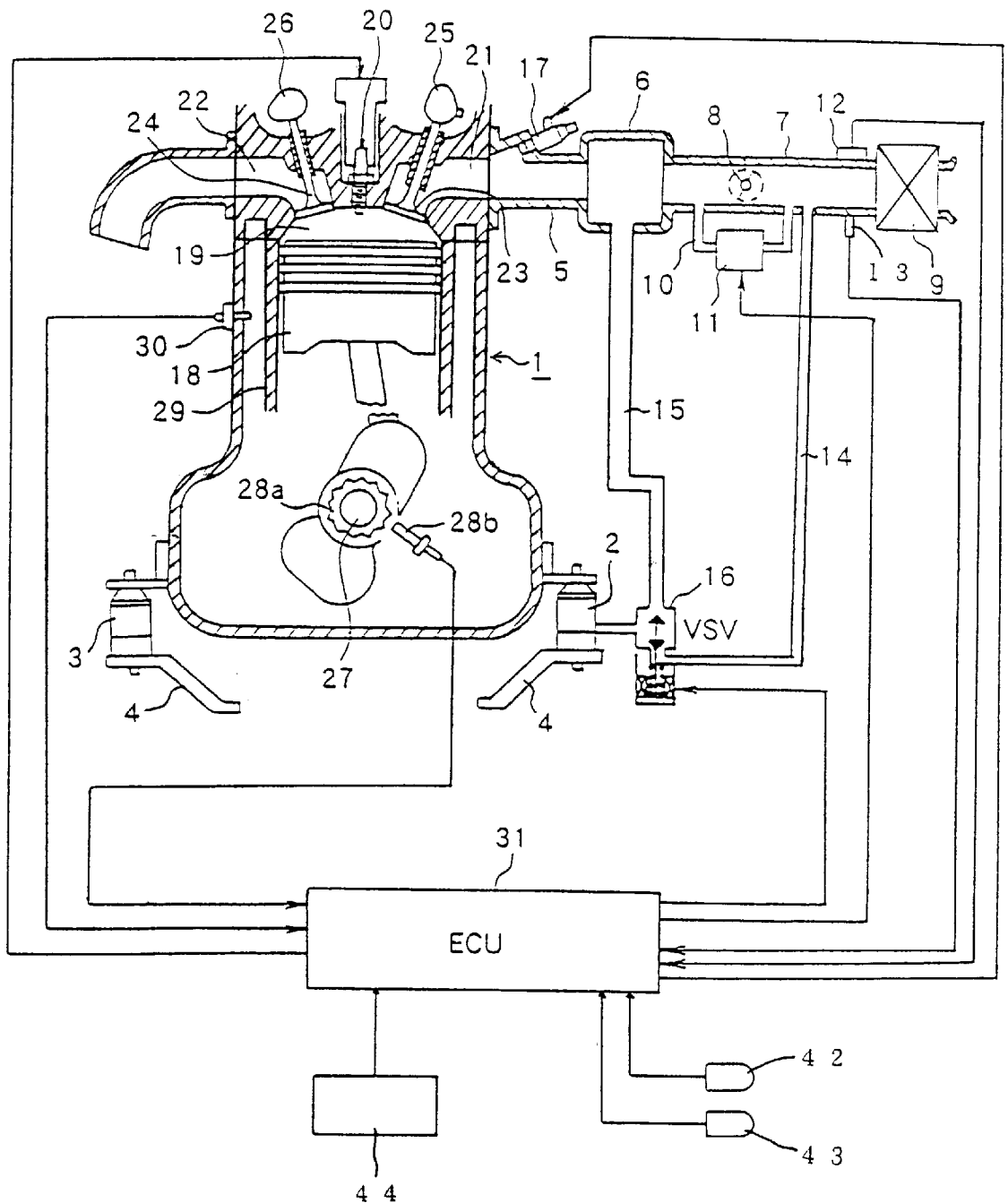
FIG. 1 is a view schematically showing a construction of an internal combustion to which a variable vibro-isolating supporting device according to the present invention is applied.

FIG. 1 is a view schematically illustrating a construction of an internal combustion engine, to which the variable vibro-isolating supporting device of the present invention is applied. This internal combustion engine 1 includes a plurality of cylinders 29 into which axially slidable pistons 18 are inserted. The piston 18 is connected to a crank shaft 27 defined as an engine output shaft. Then, a combustion chamber 19 is formed upwardly of the piston 18, and a spark plug 20 is fitted facing to this combustion chamber 19. Further, the combustion chamber 19 is formed with aperture edges of an intake port 21 and of an exhaust port 22. These aperture edges are opened and closed by an intake valve 23 and an exhaust valve 24 secured to the internal combustion engine 1. Then, the intake valve 23 and the exhaust valve 24 are so driven as to be opened and closed respectively by an intake-side cam shaft 25 and an exhaust-side cam shaft 26 which are rotatably fitted to a cylinder head of the internal combustion engine 1.

Subsequently, the internal combustion engine 1 is fitted with a crank position sensor 28 constructed of a timing rotor 28a rotating together with the crank shaft 27 and an electromagnetic pick-up 28b, and a water temperature sensor 30 for outputting an electric signal corresponding to a temperature of cooling water. Output signals of the crank position sensor 28 and of the water temperature sensor 30 are inputted via an electric wire to an electronic control unit (ECU) 31 for controlling the engine.

Next, the intake port 21 communicates with an intake branch pipe 5 attached to the internal combustion engine 1, the intake branch pipe 5 is linked to a serge tank 6, and the serge tank 6 is connected via an intake pipe 7 to an air cleaner box 9. Then, a fuel injection valve 17 is fitted to the intake branch pipe 5 so that an injection hole thereof faces to the intake port 21, and the intake pipe 7 is provided with a throttle valve 8 for opening and closing an intake passageway within the intake pipe 7, locking with an unillustrated accelerator.

Subsequently, the intake pipe 7 disposed upstream of the throttle valve 8 is fitted with an airflow meter 12 for outputting an electric signal corresponding to a mass of the air (intake air) flowing within the intake pipe 7, and an intake air temperature sensor 13 for outputting an electric signal corresponding to a temperature of the intake air. These sensors 12, 13 are connected via the electric wires to the ECU 31.

Further, the intake pipe 7 is fitted with a bypath pipe 10 for making a downstream side and an upstream side communicate with each other with respect to the throttle valve 8. This bypath pipe 10 is attached with an idle speed control valve (ISCV) 11 for controlling a flow rate of new air flowing within the bypath pipe 10.

The idle speed control valve 11 is constructed of a valve member opening and closing with repetitions, and a solenoid for driving this valve member. When inputting a driving pulse signal having a duty ratio corresponding to a ratio of a full-open time to a full-close time of the valve member, the solenoid drives the valve member in accordance with the driving pulse signal, thus controlling the flow rate of the air within the bypath pipe 10.

Figure 2:
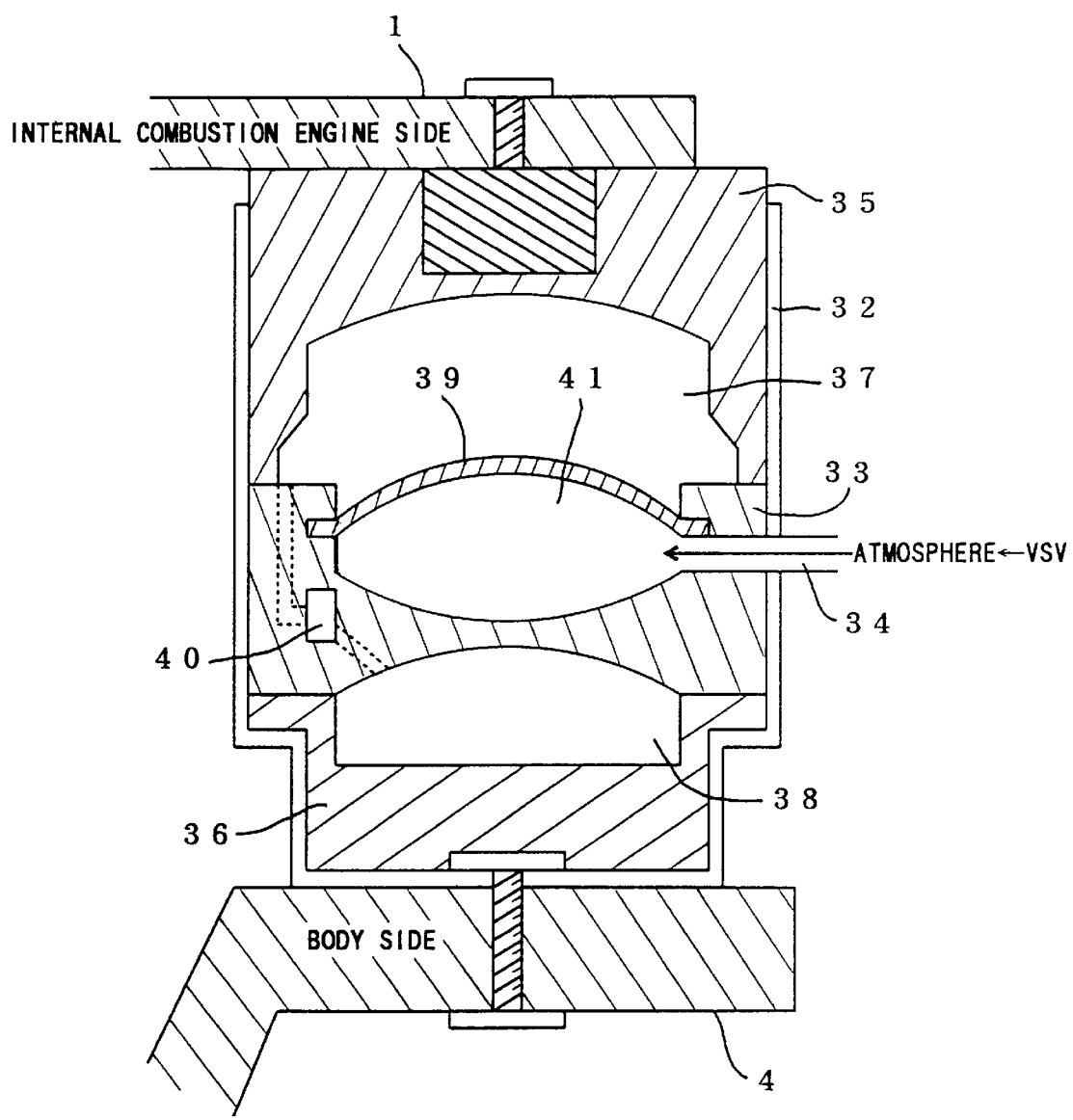
FIG. 2 is a view schematically illustrating a construction of the variable vibro-isolating supporting device.
Figure 3:
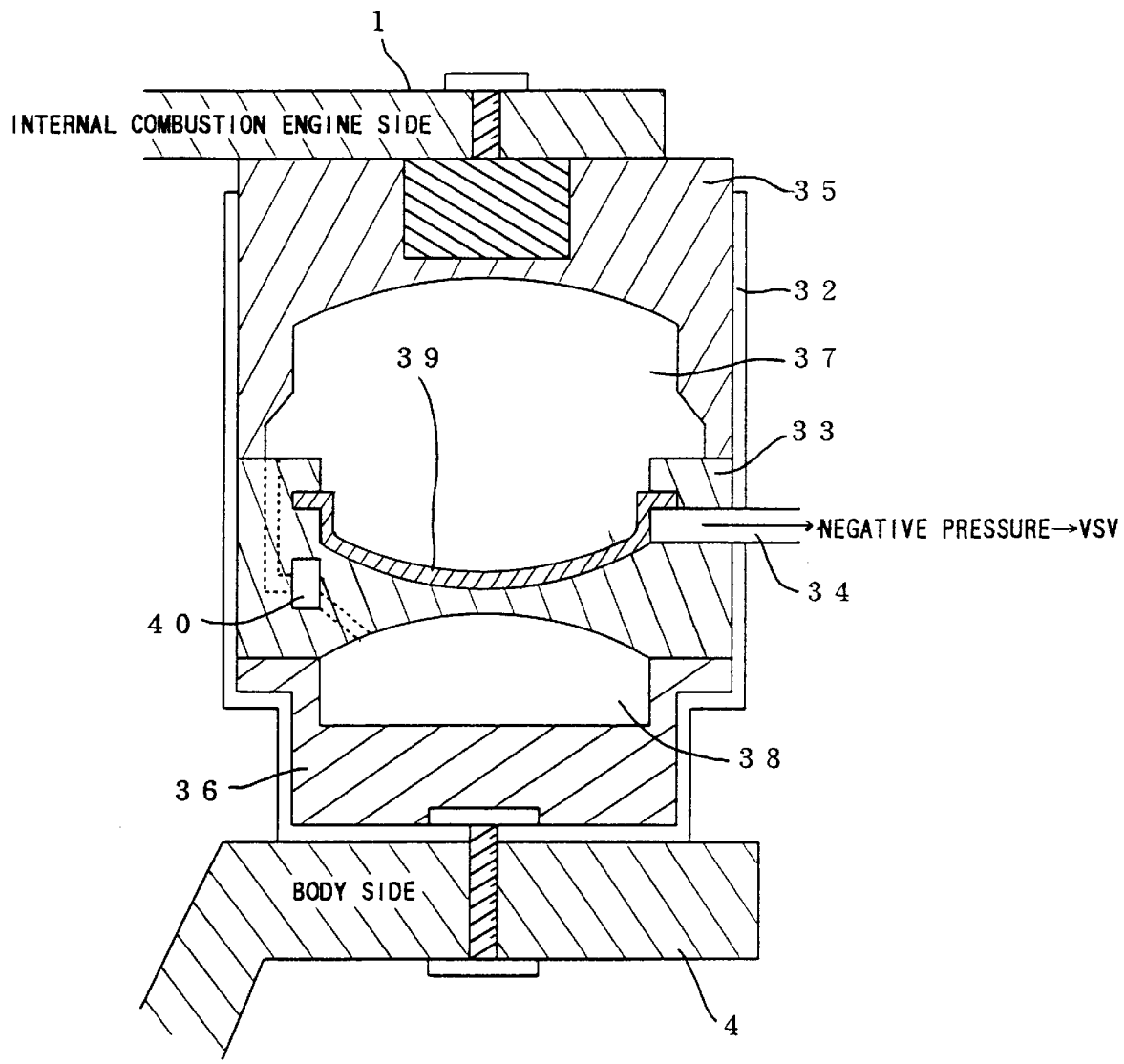
FIG. 3 is an explanatory view showing an operation of the variable vibro-isolating supporting device.

Next, the internal combustion engine 1 is supported on a car body side 4 of an automobile through a variable engine mount 2 and an engine mount 3. The variable engine mount 2 is exemplified as one of the variable vibro-isolating supporting devices according to the present invention. The variable engine mount 2 includes, as illustrated in FIGS. 2 and 3, an outer cylindrical metal member 32 with its upper portion opened, a partition plate 33, composed of a disk-like rigid member having a major diameter substantially equal to a minor diameter of this outer cylindrical metal member 32, for partitioning an interior of the outer cylindrical metal member 32 into upper and lower two chambers, a vibro-isolating base member 35 composed of an elastic material such as rubber and fixedly attached to the outer cylindrical metal member 32 by its being press-fitted into a space upper than the partition plate 33, and a vibro-isolating base member 36 composed of an elastic material such as rubber and fixedly fitted to the outer cylindrical metal member 32 by its being press-fitted into a space lower than the partition plate 33.

Then, the space is defined by the vibro-isolating base member 35 and the partition plage 33 upwardly of the partition plate 33, and subdivided into a spatial portion 37 and a spatial portion by a diaphragm 39. Then, a liquid is sealed in the spatial portion 37.

Further, a spatial portion 38 is defined by the vibro-isolating base member 36 and the partition plate 33 downwardly of the partition plate 33 of the variable engine mount 2, and a liquid is sealed in this spatial portion 38. Then, the spatial portion 38 communicates with the spatial portion 37 through an orifice 40 provided at the partition plate 33.

Moreover, a communication passageway through the spatial portion 41 communicates with the outside, is formed in the partition plate 33 and the outer cylindrical metal member 32 as well, and communicates with a vacuum switching valve VSV16.

Herein, the valve VSV16 is connected to the communication passageway 34, and is constructed of a three-way valve to which a passageway 14 connected to the intake pipe 7 dispose more upstream than the throttle valve 8 and a passageway 15 connected to the serge tank 6, are connected. This three-way valve has a valve member for switching a communication (closing of the passageway 15) between the variable engine mount 2 and the passageway 14 and a communication (closing of the passageway 14) between the variable mount 2 and the passageway 15, and a solenoid for driving the valve member in accordance with a control signal given from the ECU31. The solenoid involves the use of a battery 44 as a driving source mounted in the vehicle.

Then, the variable engine mount 2 is allowed by the VSV16 to communicate with the passageway 14, at which time, as shown in FIG. 2, the atmospheric air (pressure) flowing inside the intake pipe 7 is led into the spatial portion 41 of the variable engine mount 2. Simultaneously when a capacity of the spatial portion 41 increases, a capacity of an operating liquid chamber 37 decreases, as a result of which a pressure within the operating liquid chamber 37 increases.

On the other hand, the variable engine mount 2 is allowed by the VSV16 to communicate with the passageway 15, at which time, as shown in FIG. 3, an intake air negative pressure within the serge tank 6 is led into the spatial portion 41 of the variable engine mount 2, with the result that the atmospheric air in the spatial portion 41 is sucked out. At this time, since the diaphragm 39 is closely fitted to the partition plate 33, the capacity of the spatial portion 41 is reduced, and simultaneously the capacity of the operating liquid chamber 37 increases. As a consequence, the interior of the operating liquid chamber 37 is depressurized.

Next, the ECU31 judges an operating state of the internal combustion engine 1 from output signals transmitted from the respective sensors, and subsequently controls the spark plug 20, the fuel injection valve 17, the idle speed control valve 11 or VSV16 in accordance with the judged operating state.

The ECU31, when controlling the idle speed control valve 11, calculates a target number of idling rotations corresponding to the operating state of the internal combustion engine 1 as well as calculating a real number of engine rotations from the output signals of the crank position sensor 28. Subsequently, the ECU31 compares the target number of idling rotations with the real number of engine rotations, and calculates an optimum duty ratio in order to reduce a deviation therebetween. Then, the ECU31 applies to the idle speed control valve 11 a pulse signal corresponding to the duty ratio, and implements the control so that the real number of engine rotations becomes the target number of idling rotations.

Further, the ECU31, when controlling the VSV16 in order to damp idle vibrations of the internal combustion engine 1, judges a direction of vibrations of the internal combustion engine 1, which are caused by a combustion of mixed gases in each cylinder 29, from an ignition timing (or a timing of explosion stroke) of each cylinder 29. The ECU31 then controls the VSV16 so as to absorb the vibrations in the above vibrating direction. Herein, the internal combustion engine 1 is to rotate in a rotating direction of the crank shaft 27 (rightward rotations in FIG. 1) at every explosion stroke of each cylinder 29, and hence, on this occasion, a force in a compressing direction is applied to the variable engine mount 2. Then, the ECU31 controls the VSV16 so that the variable engine mount 2 communicates with the passageway 15, and depressurizes the spatial portion 37 following up the vibrations of the internal combustion engine 1. At this time, a dynamic spring constant of the variable engine mount 2 decreases following up the vibrations in the compressing direction, and therefore the vibrations in the compressing direction are absorbed by the variable engine mount 2.

Subsequently, when the internal combustion engine 1 rotates in the reverse direction by reaction of the above rotations, a force in a tensile direction is applied to the variable engine mount 2. Then, the ECU 31 controls the VSV16 so that the variable engine mount 2 communicates with the passageway 14, and the pressure in the spatial portion increases following up the vibrations of the internal combustion engine 1. At this time, the dynamic spring constant of the variable engine mount 2 increases following up the vibrations in the tensile direction, and hence the vibrations in the tensile direction are absorbed by the variable engine mount 2.

Furthermore, the ECU31 judges whether or not a suing environment of the variable engine mount 2 is the one in which a vibro-isolating characteristic of the variable engine mount 2 can be controlled to a desired characteristic. The ECU31, when the using environment is judge to be unable to control the vibro-isolating characteristic of the variable engine mount 2 to the desired characteristic, increases the target number of idling rotations used for the control of the idle speed control valve 11, up to a number of rotations with which the idle vibrations are not transmitted to the car body side 4.

Herein, the variable engine mount 2 is constructed to actualize the desired vibro-isolating characteristic by selectively introducing the atmospheric pressure and the intake air negative pressure. Therefore, the pressure in the spatial portion 37 can not be controlled to a desired pressure, and the desired vibro-isolating characteristic can not be actualized under such a environment that the atmospheric pressure is low, and a degree of the intake air negative pressure becomes small as in a highland etc.

Further, the variable engine mount 2 includes elastic members 35, 36, and the liquid is sealed in the device. Hence, temperatures of the elastic members 35, 36 and the liquid decrease at an extremely low temperature, and there change a hardening degree of the elastic members 35, 36 and also a viscosity of the liquid. Thus, when the characteristics of the elastic members 35, 36 and of the liquid change, the spring constant of the variable engine mount 2 changes, as a result of which the vibro-isolating characteristic of the variable engine mount 2 can not be controlled to the desired characteristic.

Moreover, the variable engine mount 2 is constructed to actualize the desired vibro-isolating characteristic with the precise operation of the VSV16, and hence, when the driving voltage of the VSV16, i.e., the output voltage of the battery 44 decreases, the VSV16 does not accurately operate, with the result that the vibro-isolating characteristic of the variable engine mount 2 can not be controlled to the desired characteristic.

As described above, under the environments in which both the atmospheric pressure and the outside air temperature are low, or in the state where the battery voltage decreases, the vibro-isolating characteristic of the variable engine mount 2 does not become the desired characteristic, and hence there must be a necessity for preventing a decline of the idle vibrations by use of a device other than the variable engine mount 2.

Such being the case, in accordance with this embodiment, the car body side 4 is fitted with an outside air temperature sensor 42 for outputting an electric signal corresponding to an outside air temperature and an atmospheric pressure sensor 43 for outputting an electric signal corresponding to an atmospheric pressure, and these sensors 42, 43 are connected via the electric wires to the ECU31 so that output signals of the sensors 42, 43 are inputted to the ECU31. Moreover, the battery 44 is connected via the electric wire to the ECU31, and an output voltage of the battery 44 is thereby inputted to the ECU31.

Then, the ECU31, when in the idling of the internal combustion engine 1, inputs the output signals of the outside temperature sensor 42 and of the atmospheric pressure sensor 43 and also the output voltage of the battery 44. If the outside temperature is under a predetermined temperature: B (° C.), if the atmospheric pressure is under a predetermined atmospheric pressure: A (mmHg), and if the battery voltage is under a predetermined voltage: C (V), the ECU31 the judges that the vibro-isolating characteristic of the variable engine mount 2 can not be controlled to the desired characteristic. Subsequently the ECU31 stops controlling the variable engine mount 2, i.e., stops controlling the VSV16, and simultaneously sets the target number of idling rotations higher by a predetermined number of rotations than normal, which target number of idling rotations are used for the control of the idle speed control valve 11. Then, the ECU31 performs the control so that the idle vibrations become hard to be transmitted to the car body side 4 by increasing a vibration frequency of the idle vibrations.

Hereinafter, an operation and effects of the present embodiment are explained.

Figure 4:
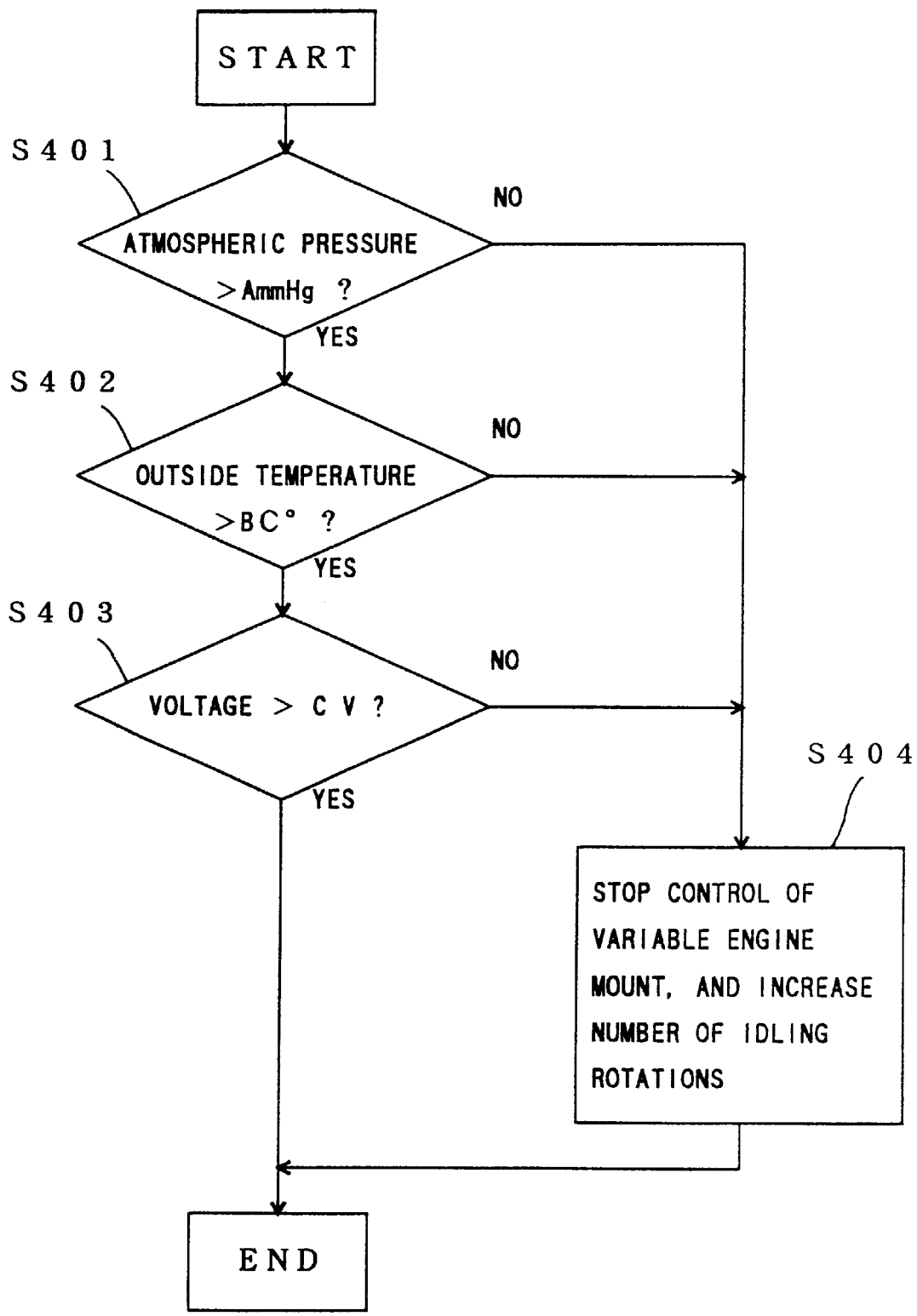
FIG. 4 is a flowchart showing a number-of-idling-rotations control routine.

The ECU31, when judging that the internal combustion engine 1 is in the idling state, executes a using environment judgement routine shown in FIG. 4. In this using environment judgement routine, the ECU31, to start with, inputs an output signal value of the atmospheric pressure sensor 43, and judges whether or not this output signal value exceeds a predetermined value: A (mmHg) (S401).

The ECU31, when judging in S401 that the output signal value of the atmospheric pressure sensor 43 exceeds the predetermined value: A (mmHg), proceeds to S402, wherein the ECU31 inputs the output signal value of the outside temperature sensor 42 and judges whether or not the output signal value exceeds a predetermined value: B (° C.).

The ECU31, when judging in S402 that the output signal value of the outside temperature sensor 42 exceeds the predetermined value: B (° C.), proceeds to S403, wherein the ECU31 inputs the voltage value of the battery 44 and judges whether or not the voltage value exceeds a predetermined value: C (V).

The ECU31, when judging in S403 that the battery voltage exceeds the predetermined value: C (V), judges that the variable engine mount 2 is used under the environment in which the vibro-isolating characteristic of the variable engine mount 2 is controllable to the desired characteristic, and finishes the processes in the using environment judgement routine. In this case, the control of the variable engine mount 2, i.e., the control of the VSV16 continues.

The ECU31, when judging in S401 that the output signal value of the atmospheric pressure sensor 43 is under the predetermined value: A (mmHg), judges that the variable engine mount 2 is used under the environment in which the vibro-isolating characteristic of the variable engine mount 2 is uncontrollable to the desired characteristic, and stops the control of the variable engine mount 2, i.e., the control of the VSV16. Simultaneously, the ECU31 sets the target number of idling rotations higher by a predetermined number of rotations than normal, which target number of idling rotations are used for the control of the idle speed control valve 11. At this time, the idle vibrations become high-frequency vibrations due to the increase in the number of rotations and hard to be transmitted to the car body side 4.

Subsequently, the ECU31, when judging in S402 that the output signal value of the outside temperature sensor 42 is under the predetermined value: B (° C.), or when judging in S403 that the battery voltage is under the predetermined value: C (V), proceeds to S404, wherein the ECU31 stops the control of the variable engine mount 2 and simultaneously increases the target number of idling rotations used for the control of the idle speed control valve 11 higher by the predetermined number of rotations.

As discussed above, in accordance with this embodiment, the frequency of the idle vibrations is increased by the rise in the number of idling rotations under the using environment in which the vibro-isolating effect derived from the variable engine mount 2 can not be obtained such as using the variable engine mount 2 at an extremely low temperature and under an extremely low pressure or in the sate where the battery voltage decreases and so forth. Therefore, the idle vibrations are hard to be transmitted to the car body side, and ill-felt riding is restrained.

Note that the present embodiment has dealt with the case where the number of idling rotations is increased when the output signal value of the outside temperature sensor 42 is under the predetermined value (when the outside temperature is extremely low). If the output signal value of the outside temperature sensor 42 is over the predetermined value, i.e., if the outside temperature is extremely high, however, the number of idling rotations may be increased. Similarly to this case, when the output signal value of the atmospheric pressure sensor 43 is above the predetermined value, i.e., when the atmospheric pressure becomes extremely high, the number of idling rotations may also be increased.

Further, the present embodiment has dealt with the case where the output signal value of the outside temperature sensor 42 substitutes for the temperature of each of the elastic members 35, 36 of the variable engine mount 2. However, the intake air temperature sensor 13 fitted to the intake system of the internal combustion engine 1 may be a substitute, or alternatively the temperature sensor may also be directly attached to the elastic member 35 or 36 of the variable engine mount 2.

Moreover, in the present embodiment, the explanation has been given by exemplifying the outside temperature, the atmospheric pressure and the battery voltage as parameters for judging the using environment in which the vibro-isolating effect derived from the variable engine mount 2 can not be obtained. The using environment may also be, however, judged by fitting a vibration sensor to the internal combustion engine 1 and using an output signal value of his vibration sensor as a parameter.

Furthermore, the present embodiment has deal with the case in which the control of the variable engine mount 2 is stopped under such a using environment that the vibro-isolating effect by the variable engine mount 2 is not obtained. The number of idling rotations may be, however, increased while continuing the control of the variable engine mount 2.

The many features and advantages of the invention are apparent from the detailed specification and, thus, it is intended by the appended claims to cover all such features and advantages of the invention which fall within the true spirit and scope of the invention. Further, sine numerous modifications and changes will readily occur to those skilled in the art, it is not desired to limit the invention to the exact construction and operation illustrated and described, and accordingly all suitable modifications and equivalent may be resorted to, falling within the scope of the invention.

What is claimed is:

1. A method of controlling idle of an internal combustion engine having a variable vibro-isolating supporting device a vibro-isolating characteristic of which is controlled to reduce idle vibrations when in an idling operation, said method comprising:

a step of increasing the number of idling rotations of said internal combustion engine by a predetermined number of rotations under a using environment in which a desired vibro-isolating effect is not obtained by said variable vibro-isolating supporting device.

2. A method of controlling idle of an internal combustion engine according to claim 1, wherein said variable vibro-isolating supporting device is a device including at least an elastic member, and wherein the number of idling rotations of said internal combustion engine is increased by the predetermined number of rotations under a using environment in which a temperature of said elastic member is over an upper limit value or under a lower limit value.

3. A method of controlling idle of an internal combustion engine according to claim 1, wherein said variable vibro-isolating supporting device is a liquid-sealed type engine mount constructed by sealing a liquid in the device, and wherein the number of idling rotations of said internal combustion engine is increased by the predetermined number of rotations under a using environment in which a temperature of the liquid is over an upper limit value or under a lower limit value.

4. A method of controlling idle of an internal combustion engine according to claim 1, wherein said variable vibro-isolating supporting device is a device for changing the vibro-isolating characteristic by introducing an atmospheric pressure into the device, and wherein the number of idling rotations of said internal combustion engine is increased by the predetermined number of rotations under a using environment in which the atmospheric pressure is over an upper limit value or under a lower limit value.

5. A method of controlling idle of an internal combustion engine according to claim 1, wherein said variable vibro-isolating supporting device is a device driven by a battery voltage, and wherein the number of idling rotations of said internal combustion engine is increased by the predetermined number of rotations under a using environment in which the battery voltage is over an upper limit value or under a lower limit value.

* * * * *